United States Patent [19]

Koumura et al.

[11] Patent Number: 4,500,918
[45] Date of Patent: Feb. 19, 1985

[54] ORIGINAL READING APPARATUS

[75] Inventors: Noboru Koumura, Narashino; Naoki Ayata, Machida; Seiji Saito, Yokosuka; Hidetoshi Suzuki; Kunitaka Ozawa, both of Tokyo, all of Japan

[73] Assignee: Canon Kabushiki Kaisha, Tokyo, Japan

[21] Appl. No.: 424,632

[22] Filed: Sep. 27, 1982

[30] Foreign Application Priority Data

Oct. 19, 1981 [JP] Japan .................................. 56-165622
Oct. 19, 1981 [JP] Japan .................................. 56-165623

[51] Int. Cl.³ ............................................. H04N 1/46
[52] U.S. Cl. .................................................... 358/75
[58] Field of Search ..................................... 358/75–80, 358/50, 55; 355/4, 32; 350/6.1, 6.5, 8, 17

[56] References Cited

U.S. PATENT DOCUMENTS 3,735,030  5/1973  Schneider ............................. 358/55
4,199,219  4/1980  Suzki ..................................... 358/75
4,226,500  10/1980  Minoura ............................. 350/6.1

Primary Examiner—Michael A. Masinick
Attorney, Agent, or Firm—Fitzpatrick, Cella, Harper & Scinto

[57] ABSTRACT

Disclosed is an original reading apparatus in which the image of an original illuminated by a lamp is formed on each of a plurality of image pick-up elements through an imaging lens and image information of different colors is converted into electrical signals by the image pick-up elements and wherein a beam splitter reflecting part of the light from the original and transmitting part of said light therethrough is provided in the imaging lens so that the reflected light and transmitted light are received by the image pick-up elements.

21 Claims, 7 Drawing Figures

ORIGINAL READING APPARATUS

BACKGROUND ON THE INVENTION

1. Field of the Invention

This invention relates to an original reading apparatus in which the images formed by lights of different colors of an original are converted into electrical signals.

2. Description of the Prior Art

Original reading apparatus are used in transmitters of facsimile or image processing apparatus such as image editing apparatus. Heretofore, in reading the image of a multicolored original, light has been applied to the original from a light source such as a halogen lamp or the like, the reflected light from the original has been passed through an imaging lens to color resolving means such as a dichroic mirror or the like, the light has been resolved into lights of a plurality of wavelength ranges by the color resolving means and imaged on light-receiving elements such as linear solid image pick-up elements.

FIG. 1 of the accompanying drawings shows an example of the construction of such a reading apparatus of the prior art. In FIG. 1, reference numeral 1 designates an original table on which an original 12 is placed, and reference numeral 2 denotes a bar-shaped light source such as a halogen lamp or a fluorescent lamp. The light source 2 is mounted in a reflector 3. Reference numerals 4, 5 and 6 designate a first, a second and a third reflecting mirror. The first reflecting mirror 4 scans the original 12 (minor scanning) while being moved with the light source 2 in the direction of arrow A along a guide rail, not shown. The second mirror 5 and the third mirror 6 are made integral by a support, not shown, and are moved on the aforementioned guide rail in the same direction B as the direction of movement of the first mirror 4 at one half of the movement velocity of the first mirror 4. By this, the length of the optical path between the original 12 and an imaging lens 7 is maintained constant. The light beam from the original passed through the mirrors 4, 5, 6, a filter 13 absorbing green light and transmitting lights of red and blue wavelength ranges therethrough, and the lens 7 in the named order enters a dichroic mirror 8 disposed rearwardly of the lens 7. In this example, the dichroic mirror 8 reflects red light and directs it to a linear solid image pick-up element, for example, a CCD 9, and transmits blue light and directs it to a linear solid image pick-up element, for example, a CCD 10. Accordingly, the image of the original 12 by red light is formed on the CCD 9 and the image of the original 12 by blue light is formed on the CCD 10. The CCDs 9 and 10 have a number of picture elements (point-like unit areas which convert light into an electrical signal) in the major scanning direction (the direction perpendicular to the plane of the drawing sheet of FIG. 1). As is well known, when the CCDs are driven, electrical signals are taken out from a number of picture elements in succession from the end thereof and a time-serial signal corresponding to the image is formed. Accordingly, by reading out the signals from the light-receiving elements such as CCDs 9 and 10 in good order (major scanning) during minor scanning, there can be obtained successive signals which have raster-scanned the original 12. The CCDs 9 and 10 read the same position of the original. Designated by 14 is a housing which contains these members therein. The lamp 2 and the mirrors 4, 5, 6 move forward to positions designated at 2', 4', 5' and 6', respectively, and then move to their respective home positions.

FIG. 2 of the accompanying drawings shows another example of the reading apparatus according to the prior art. In this example, the original is moved and scanned and the image information thereof is color-resolved into three colors, i.e., red, blue and green. In FIG. 2, reference numeral 21 designates original feeding rollers which support and slidably transport the original 12 on a platen glass 23 in the direction of arrow C. The light from a light source 15 is reflected from the original at a position P and is caused to enter an imaging lens 7 via a first mirror 16. Further, red light is reflected by a dichroic mirror 8 and a light including blue and green lights is transmitted therethrough. The transmitted light is caused to enter a dichroic mirror 17. The dichroic mirror 17 reflects blue light and transmits green light therethrough. Accordingly, the red light, the blue light and the green light are received by CCD 9, CCD 10 and CCD 11, respectively. Designated by 22 is a plate for holding down the original against the glass 23 to enable the original to be well imaged on the CCDs 9, 10 and 11.

In the above-described apparatus of the prior art, a number of means for color-resolving light corresponding to the number of image pick-up elements used are disposed only rearwardly of the lens system. Accordingly, to secure a space in which the color resolving means are disposed, a lens system having a long focal length must unavoidable be employed as the lens system, and this has led to an increased length of the optical path forward of the lens system and has prevented the apparatus from becoming compact.

SUMMARY OF THE INVENTION

It is an object of the present invention to provide A novel original reading apparatus which is capable of reading originals of plural colors and colored originals.

It is another object of the present invention to improve the optical system of an original reading apparatus for reading the image information of an original for each of plural colors.

It is still another object of the present invention to improve the optical system of an original reading apparatus for reading the image information of an original for each of plural colors and thereby make the apparatus compact.

Other objects and features of the present invention will become apparent from the following detailed description taken in conjunction with the accompanying drawings.

DESCRIPTION OF THE PREFERRED EMBODIMENTS

Figure 1:
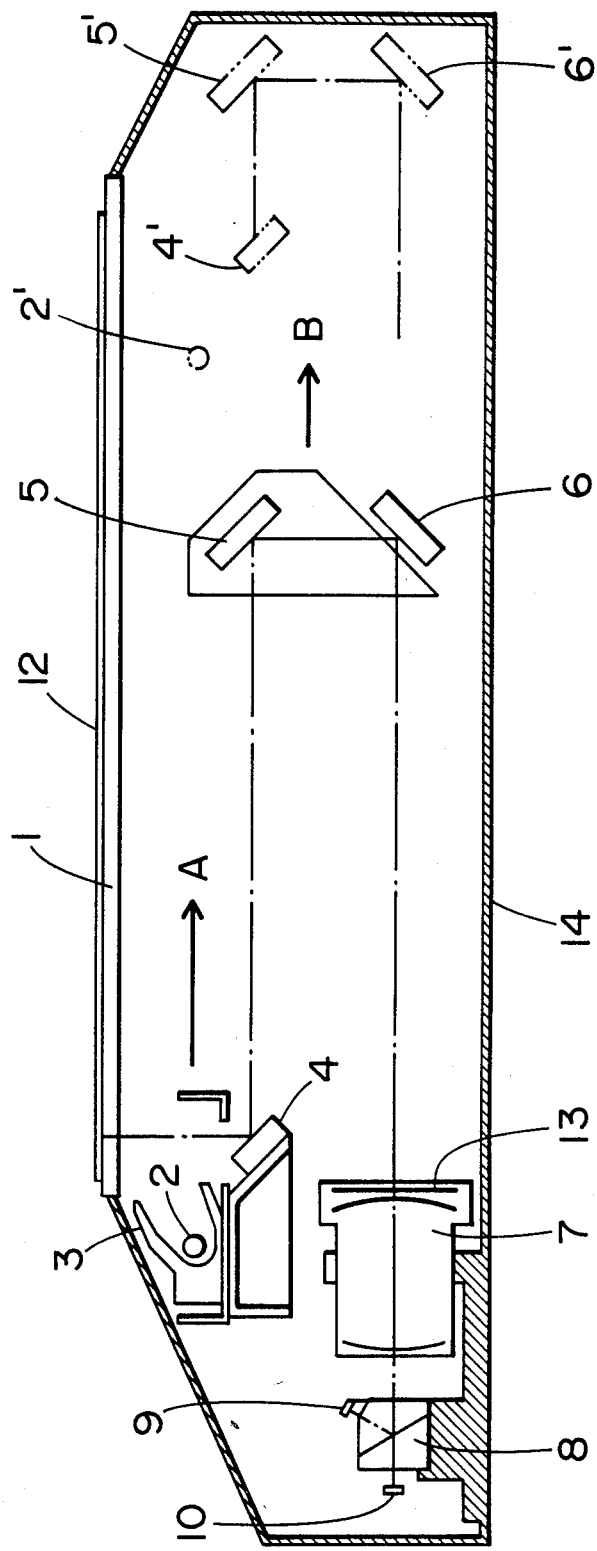
FIG. 1 illustrates an example of the original reading apparatus according to the prior art.
Figure 2:
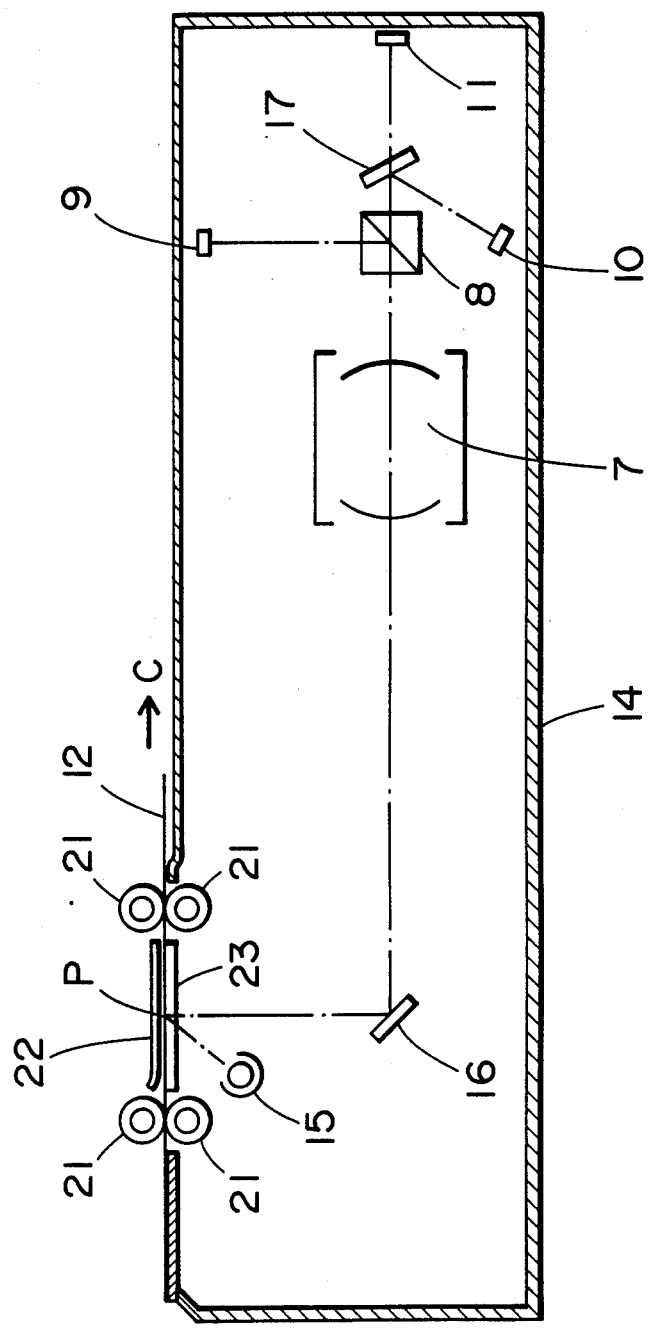
FIG. 2 illustrates another example of the original reading apparatus according to the prior art.
Figure 3:
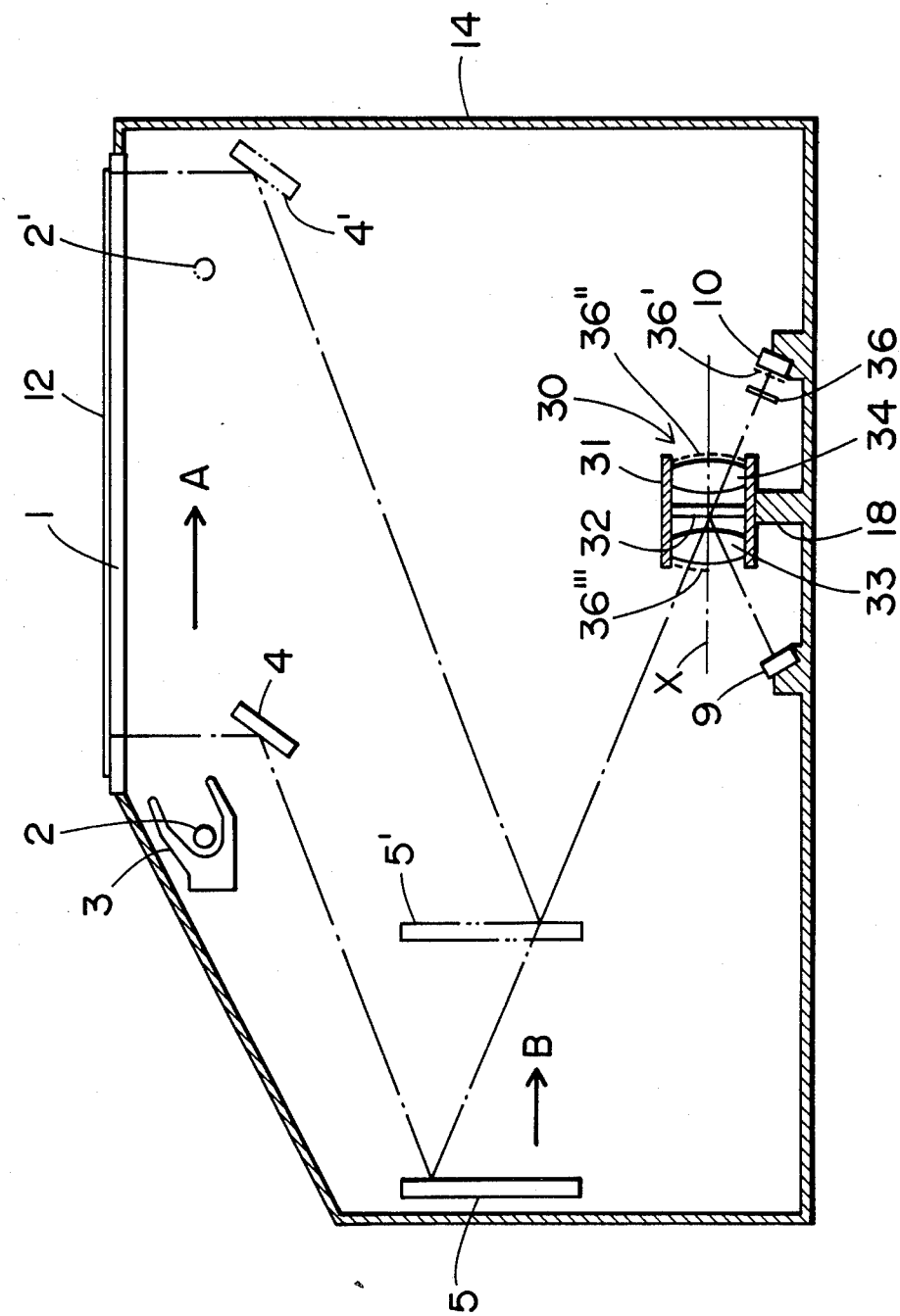
FIG. 3 illustrates an embodiment of the present invention.

Referring to FIG. 3, an original 12 placed on an original table glass 1 is scanned by mirrors 4 and 5 moved in the directions of arrows A and B parallel to the original table glass 1 at a velocity ratio of 2:1. During the scanning, the original 12 is illuminated by a lamp 2 moved with the mirror 4. The light reflected from the original 12 is reflected by the mirrors 4 and 5 in succession and enters a lens system 30.

The lens system 30 has a first lens portion 33, a second lens portion 34 and a thin flat dichroic mirror 32. The dichroic mirror 32 reflects red light and transmits blue and green light therethrough. The dichroic mirror 32 is disposed between the first lens portion 33 and the second lens portion 34, and these three are integrally and fixedly supported in a single lens barrel 31. The dichroic mirror 32 is fixed to the lens barrel 31 so that the reflecting surface thereof is perpendicular to the optical axis X of the lens system 30.

The lens system 30 is mounted on a pedestal 18 while being oriented so that the optical axis X thereof is inclined relative to the principal light ray of the light beam from the original which enters the lens system 30. In other words, the light from the original enters the lens system 30 as a so-called off-axis light beam.

The light from the original which has arrived at the lens system 30 first passes through the first lens portion 33 to the dichroic mirror 32. The dichroic mirror 32 reflects light of red wavelength range and transmits lights of blue and green wavelength ranges therethrough. The light reflected by the dichroic mirror 32 again passes through the first lens portion 33 and exits forwardly of the lens system 30 and enters a CCD 9 similar to that previously described. In this manner, the red light passes through the first lens portion 33 twice and thus, the image of the original in red light is formed on the CCD 9.

On the other hand, the light transmitted through the dichroic mirror 32 passes through the second lens portion 34 and exits rearwardly of the lens system 30 and enters a CCD 10 similar to that previously described. A filter 36 which absorbs green light and transmits blue light therethrough is disposed between the lens system 30 and the CCD 10. Accordingly, blue light enters the CCD 10. In any case, the blue light passes through the first lens portion 33 and the second lens portion 34 in succession and thus, the image of the original in blue light is formed on the CCD 10.

Thus, the CCD 9 puts out an electrical signal corresponding to the red information of the original, and the CCD 10 puts out an electrical signal corresponding to the blue information of the original. The signals from the CCDs 9 and 10 are converted into digital signals by a well-known analog-digital converting circuit, and the one-unit signal which is the digital signal formed by the signal from the CCD 9 and the one-unit signal which is the digital signal formed by the signal from the CCD 10 may preferably correspond to the same area on the original. Therefore, the lens system 30 forms the image of the original substantially at the same magnification on the CCD 9 and the CCD 10. The CCD 9 and the CCD 10 have substantially the same picture element pitch (the spacing between the centers of adjacent picture elements).

Figure 4:
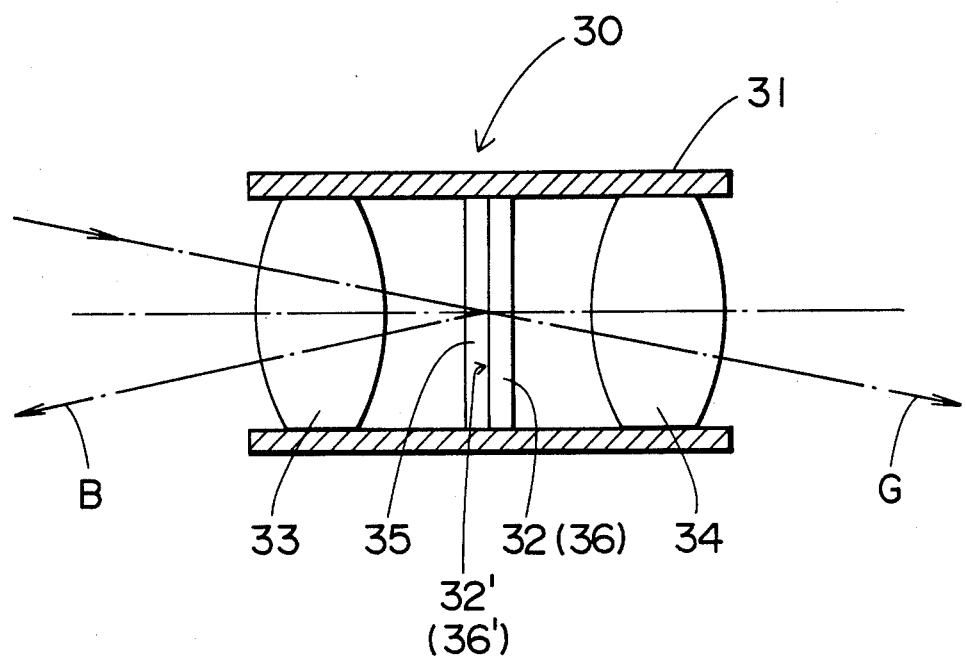
FIG. 4 illustrates an example of the lens system which is an essential portion of the present invention.

In order that, as described above, the images of the original at the same magnification may be formed on the CCD 9 and the CCD 10, the first lens portion 33 and the second lens portion 34 of the lens system 30 have substantially the same lens power. For example, the first lens portion 33 and the second lens portion 34 are of the same construction. That is, a so-called symmetric type lens can be used as the lens system 30. The dichroic mirror 32 is disposed at an optically intermediate position between the first lens portion 33 and the second lens portion 34. In other words, the first lens portion 33 and the second lens portion 34 are disposed so that they are optically symmetric with respect to the dichroic mirror 32. More particularly, the dichroic mirror 32 is disposed so that the optical distance between the first lens portion 33 and the reflecting system (the color resolving surface) of the dichroic mirror 32 is equal to the optical distance between said reflecting surface and the second lens portion 34. For example, if the geometrical distance between the first lens portion 33 and the second lens portion 34 is D and the thickness of the dichroic mirror 32 is d and the refractive index of the dichroic mirror 32 is n and the surface of the dichroic mirror 32 which is opposed to the first lens portion 33 is the reflecting surface (the color resolving surface), then the spacing between the first lens portion 33 and the dichroic mirror 32 is set to $\frac{1}{2}\{D+1/n\,(1-1)d\}$. Conversely, when the reflecting surface of the dichroic mirror 32 is made opposed to the second lens portion 34, the spacing between this reflecting surface and the second lens portion 34 is set to a value represented by the above formula. On the other hand, where the reflecting surface of the dichroic mirror 32 is disposed at the geometrical center between the first lens portion 33 and the second lens portion 34, an optical path length correcting plate 35 is disposed between the first lens portion 33 and the second lens portion 34, as shown in FIG. 4. FIG. 4 shows an example in which the reflecting surface 32' of the dichroic mirror 32 is disposed on the first lens portion 33 side, and a transparent flat plate having the same thickness and the same refractive index as the substrate of the dichroic mirror 32, namely, a transparent flat plate 35 having the same optical thickness as the dichroic mirror 32, is cemented to said reflecting surface 32'. Alternatively, the transparent flat plate 35 may be disposed between the first lens portion 33 and the dichroic mirror 32 parallel to the dichroic mirror 32 with a spacing with respect to the dichroic mirror 32. In any case, in the described manner, the optical distance between the reflecting surface 32' of the dichroic mirror 32 and the first lens portion 33 can be made equal to the optical distance between the reflecting surface 32' and the second lens portion 34. Also, where the reflecting surface 32' is disposed on the second lens portion 34 side so that it lies at the geometrical center between the first and second lens portions 33 and 34, the aforementioned transparent flat plate 35 may be disposed between the dichroic mirror 32 and the second lens portion 34. (This also holds true of a half-mirror 36 having a reflecting surface 36' which will later be described.)

In FIG. 3, instead of the filter 36, a filter film 36' may be applied to the CCD 10 as by evaporation, or a filter film 36" may be applied to the surface of the lens portion 34 as by evaporation, or a filter film 36'" may be applied, as by evaporation, to the upper half of the front surface of the first lens portion 33 above the optical axis X, that is, the area of the front surface of the first lens portion 33 on which the light from the original is first incident. The filter film 36', 36" or 36'" blocks the passage of green light.

Figure 5:
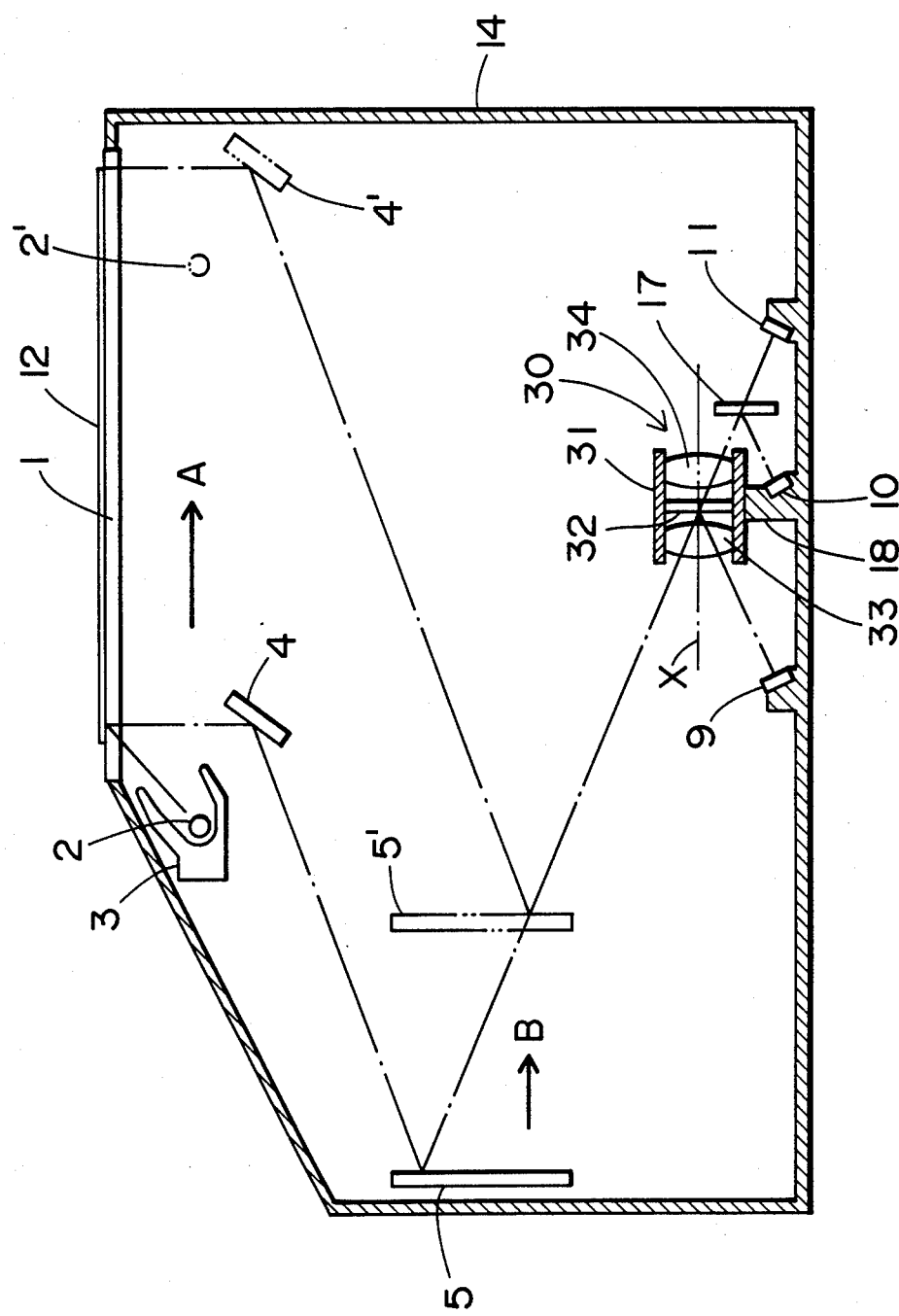
FIG. 5 illustrates another embodiment of the present invention.

FIG. 5 shows a modification of the FIG. 3 embodiment. A dichroic mirror 17 which reflects blue light and transmits green light therethrough is disposed in the optical path of the light beam having exited rearwardly of the aforementioned lens system 30. The blue light reflected by the dichroic mirror 17 is directed to the CCD 10 and the green light transmitted through the dichroic mirror 17 is directed to a CCD 11. As previously described, the lens system 30 forms the images of the original substantially at the same magnification on the CCDs 9, 10 and 11. The CCDs 9, 10 and 11 have the same picture element pitch. In the embodiment of FIG. 5, the filter 36, 36', 36" or 36'" of FIG. 3 is not used.

Figure 6:
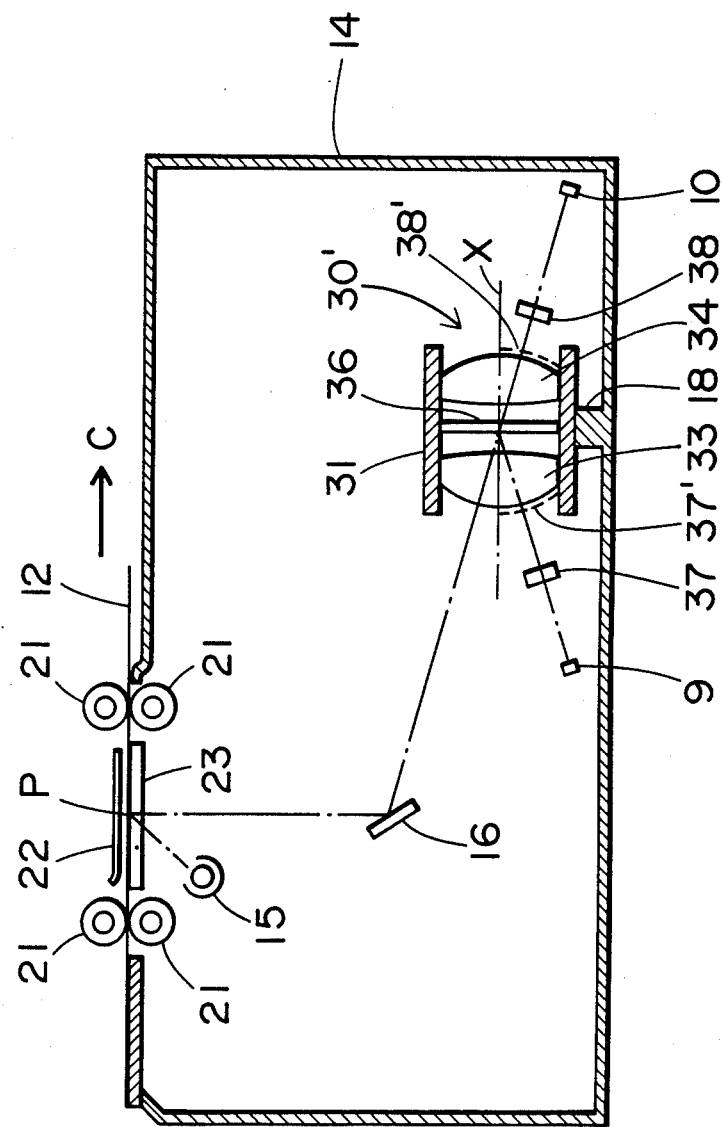
FIG. 6 illustrates still another embodiment of the present invention.

In the embodiment of FIG. 6, use is made of a lens system 30' in which the dichroic mirror 32 of the aforementioned lens system 30 is replaced with a half-mirror 36. The half-mirror is a beam splitter which reflects part of incident light and transmits part of the incident light therethrough. The dichroic mirror is a beam splitter having a wavelength selecting characteristic, whereas the half-mirror does not have a wavelength selecting characteristic. Accordingly, the spectral distributions of the light reflected by the half-mirror and the light transmitted through the half-mirror are substantially the same.

Now, in FIG. 6, the original 12 is transported on a platen glass 23 by feed rollers 21 as previously described and at that time, the original is illuminated by a lamp 15. The light reflected from the original is directed as an off-axis light beam to the lens system 30' by a mirror 16. The light from the original incident on the first lens portion 33 of the lens system 30' is partly reflected by the half-mirror 36 and again passes through the first lens portion 33 and exits forwardly of the lens system 30', and passes through a filter 37 which transmits only red light therethrough, and then enters the CCD 9. On the other hand, the light transmitted through the half-mirror 36 passes through the second lens portion 34 and further through a filter 38 which transmits only blue light therethrough, and enters the CCD 10. Thus, the image of the red information of the original is formed on the CCD 9 and the image of the blue information of the original is formed on the CCD 10. The lens system 30' forms the images of the original substantially at the same magnification on the CCDs 9 and 10, in the same manner as that described in connection with the previous embodiment.

In FIG. 6, a filter film 37' which transmits only red light therethrough may be applied, as by evaporation, to the lower half area of the front surface of the first lens portion 33 below the optical axis X, namely, the area through which only the light leaving the first lens portion after being reflected by the half-mirror 36 passes, or to the CCD 9. Likewise, a filter film 38' which transmits only blue light therethrough may be applied to the second lens portion 34 or the CCD 10 as by evaporation.

Figure 7:
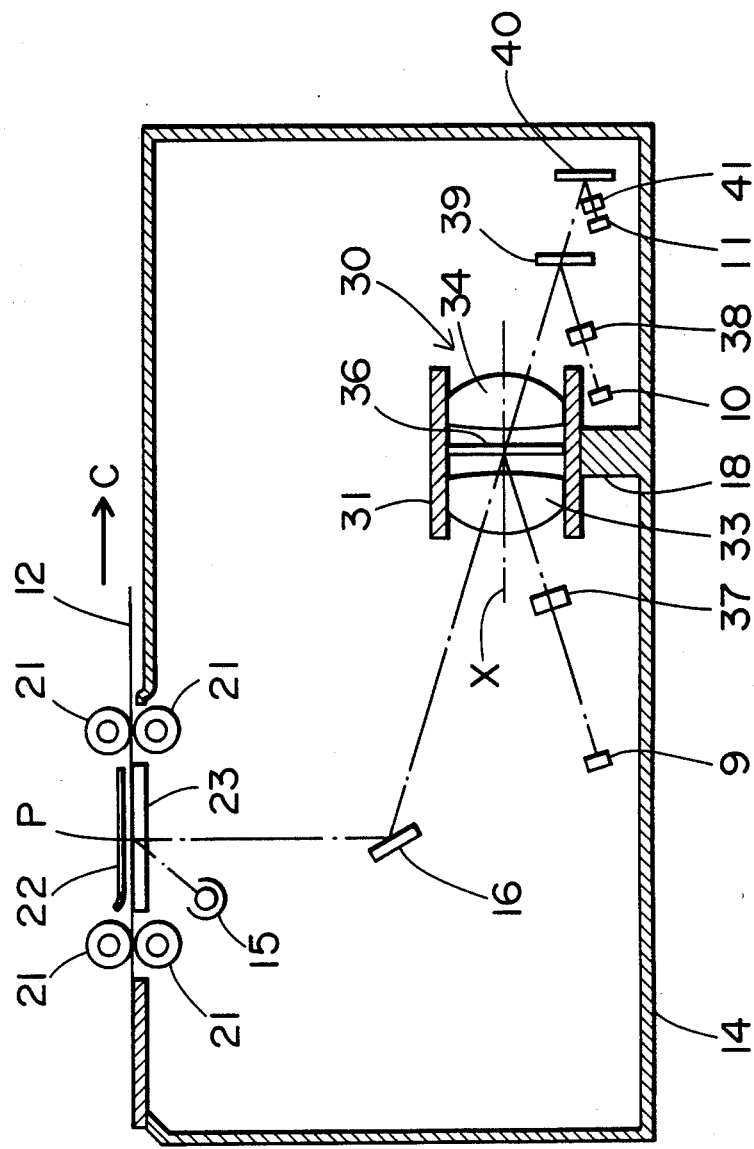
FIG. 7 illustrates yet still another embodiment of the present invention.

FIG. 7 shows a modification of the FIG. 6 embodiment. In this modification, a half-mirror 39 is disposed in the optical path of the light beam having exited rearwardly of the lens system 30', and this light beam is divided into two by the half-mirror. The light reflected by the half-mirror 39 passes through a filter 38 which transmits only blue light therethrough, and enters the CCD 10, while the light transmitted through the half-mirror 39 is reflected by a total reflection mirror 40, whereafter it passes through a filter 41 which transmits only green light therethrough, and enters the CCD 11. Thus, the image of the red information of the original is formed on the CCD 9, the image of the blue informatin of the original is formed on the CCD 10, and the image of the green information of the original is formed on the CCD 11. The lens system 30' forms images substantially at the same magnification on the CCDs 9, 10 and 11, as previously described.

Again in the embodiment of FIG. 7, a filter film 37' similar to that previously described may be applied to the CCD 9 or the lower half of the first lens portion 33 below the optical axis X. A filter film which transmits only blue light therethrough like the filter 38 may be applied to the CCD 10 as by evaporation, and a filter film which transmits only green light therethrough like the filter 41 may be applied to the CCD 11 as by evaporation. Alternatively, if the half-mirror 39 is replaced with a dichroic mirror which reflects blue light and the total reflection mirror 40 is replaced with a dichroic mirror which reflects green light, the filters 38 and 41 may be eliminated.

In the embodiment of FIG. 7, the light beam transmitted through the half-mirror 36 and having exitted rearwardly of the lens system 30' is resolved into two color lights, but the light beam reflected by the half-mirror 36 and having exited forwardly of the lens system 30' may be resolved into two color lights. In this case, the half-mirror 39 may be disposed in the optical path between the first lens portion 33 and the filter 37 and the light reflected by this half-mirror 39 may be caused to pass through the filter 38 to the CCD 10.

The term "color resolution" used herein means extracting a light of desired color wavelength range from a light. Accordingly, dichroic mirrors and colored filters are color-resolving optical elements.

In the above-described embodiment, color information of two colors such as red and blue or three colors such as red, blue and green is read, but the present invention is also applicable to an apparatus which reads color information of four or more colors or color information of other colors than red, blue and green. The image pick-up elements are not restricted to the CCDs, but other image pick-up elements such as MOS type image pick-up elements may also be used.

The signals obtained from the image pick-up elements 9, 10 and 11 are immediately supplied to the recording apparatus or once stored in a memory device, whereafter the signals are supplied from the memory device to the recording apparatus and used for the driving of an ink jet head, a thermal printer, a laser beam printer or the like. Such technique is well-known and therefore need not be described.

We claim:

1. An original reading apparatus including:
   original supporting means for supporting an original to be read;
   original illuminating means for illuminating the original;
   a lens system for forming a plurality of optical images of the original, said lens system having a first lens portion, a second lens portion and a dichroic mirror disposed between said first and said second lens portions and reflecting a light of a first color and transmitting a light of a second color therethrough;
   a first image pick-up element for forming an electrical signal corresponding to the image of the original, said first image pick-up element being disposed at a position whereat, of the light from the original, the light of the first color passed through said first lens portion, reflected by said dichroic mirror and again passed through said first lens portion forms the image of the original; and a second image pick-up element for forming a electrical signal corresponding to the image of the original, said second image pick-up element being disposed at a position whereat, of the light from the original, the light of the second color passed through said first lens portion, said dichroic mirror and said second lens portion in the named order forms the image of the original.

2. An original reading apparatus according to claim 1, wherein said lens system forms the image of the original by the light of the first color and the image of the original by the light of the second color substantially at the same magnification.

3. An original reading apparatus according to claim 2, wherein said first image pick-up element and said second image pick-up element are solid image pick-up elements having the same picture element pitch.

4. An original reading apparatus including:

original supporting means for supporting an original to be read;

original illuminating means for illuminating the original;

a lens system for forming a plurality of optical images of the original, said lens system having a first lens portion, a second lens portion and a dichroic mirror disposed between said first and said second lens portion and reflecting a light of a first color and transmitting a light of a second color therethrough;

a color resolving optical system for resolving, of the light from the original, the light passed through said first lens portion, said dichroic mirror and said second lens portion in the named order into a light of a second color and a light of a third color;

a first image pick-up element for forming an electrical signal corresponding to the image of the original, said first image pick-up element being disposed at a position whereat, of the light from the original, the light of the first color passed through said first lens portion, reflected by said dichroic mirror and again passed through said first lens portion forms the image of the original;

a second image pick-up element for forming an electrical signal corresponding to the image of the original, said second image pick-up element being disposed at a position whereat the light of the second color passed through said color resolving optical system forms the image of the original; and a third image pick-up element for forming an electrical signal corresponding to the image of the original, said third image pick-up element being disposed at a position whereat the light of the third color passed through said color resolving optical system forms the image of the original.

5. An original reading apparatus according to claim 4, wherein said lens system forms the image of the original by the light of the first color, the image of the original by the light of the second color and the image of the original by the light of the third color substantially at the same magnification.

6. An original reading apparatus according to claim 5, wherein said first image pick-up element, said second image pick-up element and said third image pick-up element are solid image pick-up elements having the same picture element pitch.

7. An original reading apparatus including:

original supporting means for supporting an original to be read;

original illuminating means for illuminating the original;

a lens system for forming a plurality of optical images of the original, said lens system having a first lens portion, a second lens portion and a half-mirror disposed between said first and said second lens portion;

a first image pick-up element for forming an electrical signal corresponding to the image of the original, said first image pick-up element being disposed at a position whereat, of the light from the original, the light passed through said first lens portion, reflected by said half-mirror and again passed through said first lens portion forms the image of the original;

a second image pick-up element for forming an electrical signal corresponding to the image of the original, said second image pick-up element being disposed at a position whereat, of the light from the original, the light passed through said first lens portion, said half-mirror and said second lens portion in the named order forms the image of the original;

first color resolving means for passing a light of a first color to said first image pick-up element, said first color resolving means being disposed in the optical path between said lens system and said first image pick-up element; and second color resolving means for passing a light of a second color to said second image pick-up element, said second color resolving means being disposed in the optical path between said lens system and said second image pick-up element.

8. An original reading apparatus according of claim 7, wherein said lens system forms the image of the original by the light of the first color and the image of the original by the light of the second color substantially at the same magnification.

9. An original reading apparatus according to claim 8, wherein said first image pick-up element and said second image pick-up element are solid image pick-up elements having the same picture element pitch.

10. An original reading apparatus according to claim 7, wherein said first color resolving means resolves the light from said lens system into a light of a first color and a light of a third color, and the apparatus has a third image pick-up element for forming an electrical signal corresponding to the image of the original, said third image pick-up element being disposed at a position whereat the light of the third color forms the image of the original.

11. An original reading apparatus according to claim 10, wherein said lens system forms the image of the original by the light of the first color, the image of the original by the light of the second color and the image of the original by the light of the third color substantially at the same magnification.

12. An original reading apparatus according to claim 11, wherein said first image pick-up element, said second image pick-up element and said third image pick-up element are solid image pick-up elements having the same picture element pitch.

13. An original reading apparatus according to claim 7, wherein said second color resolving means resolves the light from said lens system into a light of a second color and a light of a third color, and the apparatus has a third image pick-up element for forming an electrical signal corresponding to the image of the original, said third image pick-up element being disposed at a position whereat the light of the third color forms the image of the original.

14. An original reading apparatus according to claim 13, wherein said lens system forms the image of the original by the light of the first color, the image of the original by the light of the second color and the image of the original by the light of the third color substantially at the same magnification.

15. An original reading apparatus according to claim 14, wherein said first image pick-up element, said second image pick-up element and said third image pick-up element are solid image pick-up elements having the same picture element pitch.

16. An original reading apparatus according to any of claims 2, 3, 5 and 6, wherein the first lens portion and the second lens portion of said lens system have substantially the same power.

17. An original reading apparatus according to claim 16, wherein said first lens portion and said second lens portion are disposed substantially optically symmetrically with respect to said dichroic mirror.

18. An original reading apparatus according to claim 16, wherein a transparent plate having the same optical thickness as the optical thickness of said dichroic mirror is disposed between said first lens portion and said second lens portion.

19. An original reading apparatus according to any of claims 8, 9, 11, 12, 14 and 15, wherein the first lens portion and the second lens portion of said lens system have substantially the same power.

20. An original reading apparatus according to claim 19, wherein said first lens portion and said second lens portion are disposed substantially optically symmetrically with respect to said half-mirror.

21. An original reading apparatus according to claim 19, wherein a transparent plate having the same optical thickness as the optical thickness of said half-mirror is further disposed between said first lens portion and said second lens portion.

* * * * *